(12) United States Patent
Axrup et al.

(10) Patent No.: US 10,364,297 B2
(45) Date of Patent: Jul. 30, 2019

(54) METHOD FOR MANUFACTURING MICROFIBRILLATED POLYSACCHARIDE

(71) Applicant: Stora Enso OYJ, Helsinki (FI)

(72) Inventors: Lars Axrup, Hammarö (SE); Henri Kastinen, Imatra (FI)

(73) Assignee: STORA ENSO OYJ, Helsinki (FI)

( * ) Notice: Subject to any disclaimer, the term of this patent is extended or adjusted under 35 U.S.C. 154(b) by 53 days.

(21) Appl. No.: 15/523,177

(22) PCT Filed: Oct. 26, 2015

(86) PCT No.: PCT/IB2015/058238
§ 371 (c)(1),
(2) Date: Apr. 28, 2017

(87) PCT Pub. No.: WO2016/067180
PCT Pub. Date: May 6, 2016

(65) Prior Publication Data
US 2017/0320969 A1  Nov. 9, 2017

(30) Foreign Application Priority Data
Oct. 28, 2014 (SE) ..................... 1451287

(51) Int. Cl.
| | | |
|---|---|---|
| *D21H 11/18* | (2006.01) | |
| *C08B 1/00* | (2006.01) | |
| *C08B 15/00* | (2006.01) | |
| *D21C 9/00* | (2006.01) | |
| *D21H 11/20* | (2006.01) | |
| *D21H 15/02* | (2006.01) | |
| *D21C 5/00* | (2006.01) | |
| *C08B 15/02* | (2006.01) | |
| *C08L 1/02* | (2006.01) | |

(52) U.S. Cl.
CPC ............... *C08B 1/00* (2013.01); *C08B 15/00* (2013.01); *C08B 15/02* (2013.01); *C08L 1/02* (2013.01); *D21C 5/005* (2013.01); *D21C 9/00* (2013.01); *D21C 9/007* (2013.01); *D21H 11/18* (2013.01); *D21H 11/20* (2013.01); *D21H 15/02* (2013.01)

(58) Field of Classification Search
USPC .......................................... 162/70
See application file for complete search history.

(56) References Cited

U.S. PATENT DOCUMENTS

| | | |
|---|---|---|
| 4,374,702 A | 2/1983 | Turbak et al. |
| 2011/0277947 A1 | 11/2011 | Hua et al. |
| 2014/0124150 A1 | 5/2014 | Sabourin et al. |
| 2014/0127756 A1 | 5/2014 | Bolz et al. |

FOREIGN PATENT DOCUMENTS

| | | |
|---|---|---|
| EP | 2196579 A1 | 6/2010 |
| WO | 2007091942 A1 | 8/2004 |
| WO | 2011004301 A1 | 1/2011 |
| WO | 2014029909 A1 | 2/2014 |

OTHER PUBLICATIONS

International Search Report for PCT/IB2015/058238, dated Feb. 25, 2016.
Lavoine, N. et al "Microfibrillated Cellulose—Its barrier properties and applications in cellulosic materials: a review", Carbohydrate Polymers, 2012, pp. 735-764, vol. 90.
Henriksson, M. et al "An environmentally friendly method for enzyme-assisted preparation of microfibrillated cellulose (MFC) nanofibers", European Polymer Journal, 2007, pp. 3434-3441, vol. 43.
Pääkkö, M. et al "Enzymatic Hydrolysis Combined with Mechanical Shearing and High-pressure Homogenization for Nanoscale Cellulose Fibrils and Strong Gels", Biomacromolecules, 2007, pp. 1934-1941, vol. 8.
Siqueria, Gilberto, et al., "Morphological Investigation of Nanoparticles Obtained from Combined Mechanical Shearing, and Enzymatic and Acid Hydrolysis of Sisal Fibers," Cellulose (2010), vol. 17, pp. 1147-1158.

*Primary Examiner* — Mark Halpern
(74) *Attorney, Agent, or Firm* — Greer, Burns & Crain, Ltd.

(57) ABSTRACT

The present invention relates to a method for manufacturing microfibrillated polysaccharide, preferably microfibrillated cellulose. The invention also relates to microfibrillated cellulose obtainable by the method and use of the microfibrillated cellulose. The method of manufacturing microfibrillated cellulose comprises the following steps: a) Providing a hemicellulose containing pulp, b) Providing wood degrading enzymes c) Mixing pulp and enzymes d) Keeping the mixture in a continuous, flowing system of essentially cylindrical geometry (for example in a plug-flow reactor), e) Conveying the mixture to one or more mixing zones for recirculating and homogenizing the mixture, and f) Harvesting microfibrillated cellulose with a relatively narrow size distribution during the recirculation.

28 Claims, 4 Drawing Sheets

Figure 1:
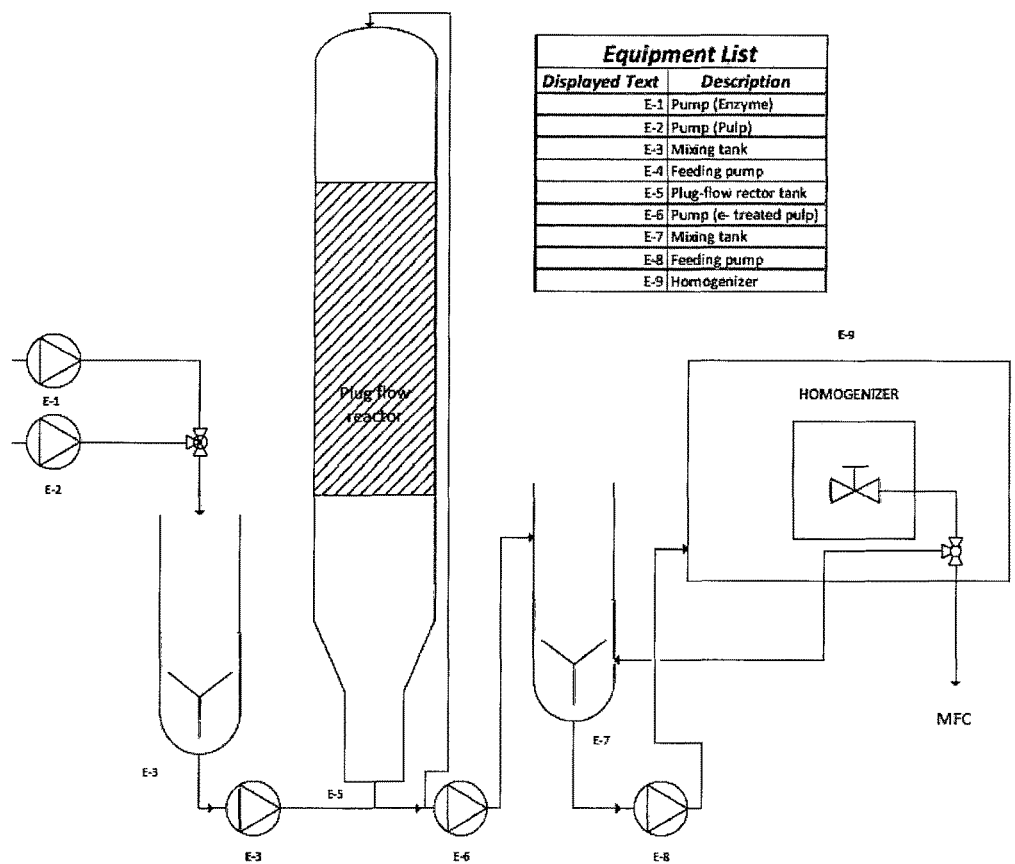

Fig 1. gives an overview for the general process of the process setup according to the first aspect. By introduction of a plug flow reactor the separate vessel for batch wise enzyme treatment can be omitted and the enzyme treatment can be run in a continuous mode. (e-treated = enzyme treated)

Figure 2:
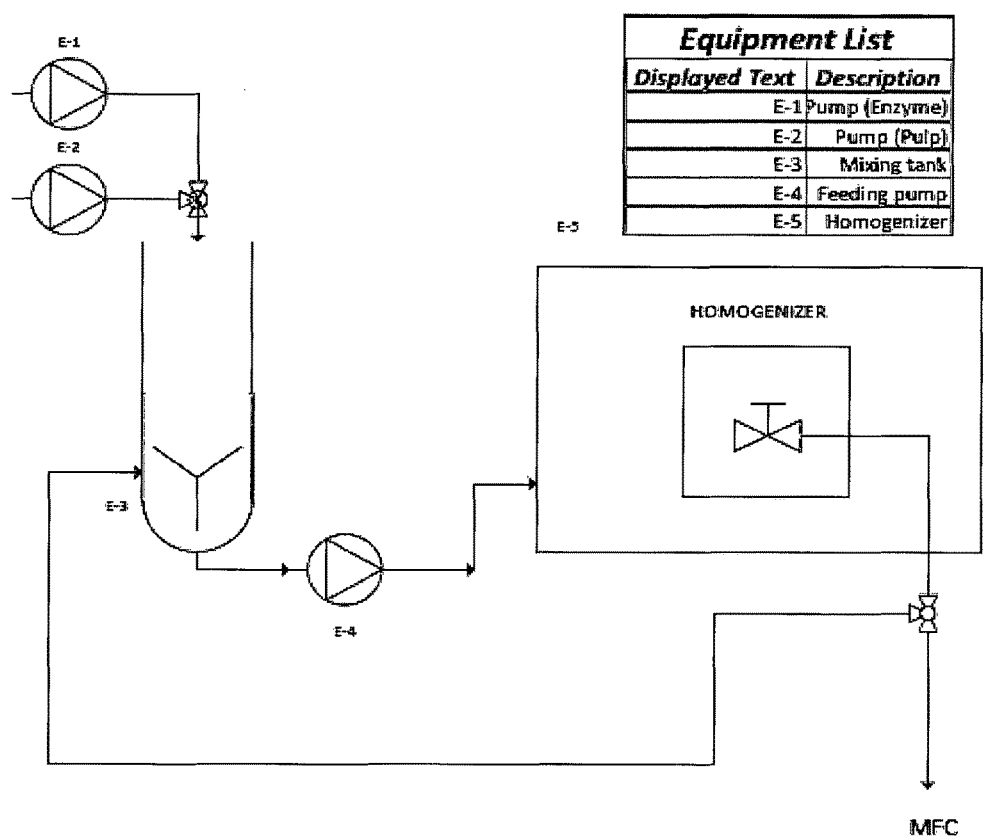

Fig 2. shows a further preferred embodiment of the general process schematic of the refinerless MFC process setup according to the first aspect.

Figure 3:
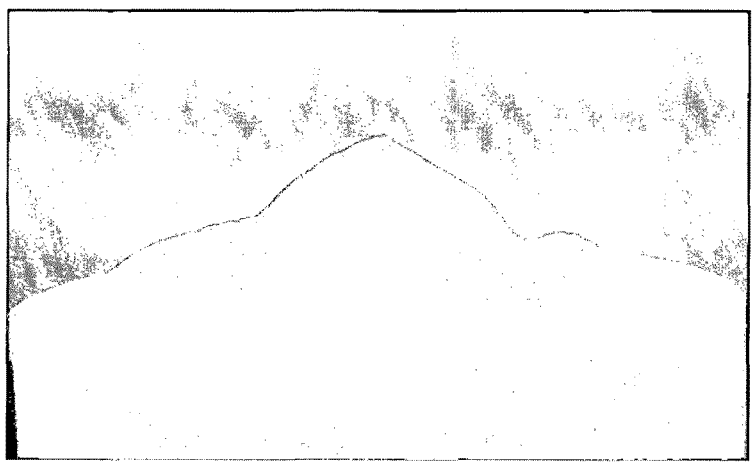

Fig. 3. MFC produced by the refinerless process according to the first aspect.

Figure 4:
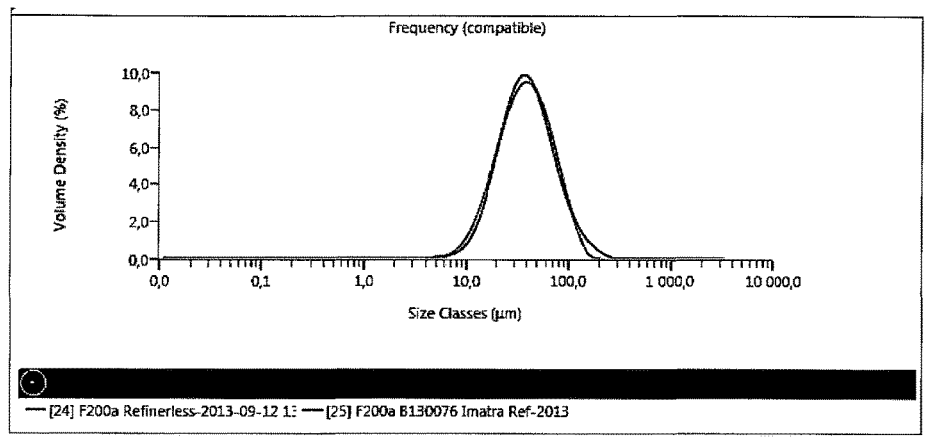

Fig 4. Black curve (red curve); Size distribution by laser diffraction of the MFC produced with the refinerless process week 38 – 2013, Grey curve (green curve); MFC produced at a plant batch 130076 as comparison.

METHOD FOR MANUFACTURING MICROFIBRILLATED POLYSACCHARIDE

This application is a U.S. National Stage under 35 U.S.C. § 371 of International Application No. PCT/IB2015/058238 filed Oct. 26, 2015, which claims priority to Swedish Patent Application No. 1451287-5 filed Oct. 28, 2014.

FIELD OF INVENTION

The present invention relates to a method for manufacturing microfibrillated polysaccharide, preferably a microfibrillated cellulose, wherein said method is refinerless. The invention also relates to a polysaccharide such as microfibrillated cellulose obtainable from said process and also uses of said polysaccharide.

BACKGROUND

Microfibrillated cellulose (MFC), which also is known as nanocellulose, is a material typically made from wood cellulose fibers. It can also be made from microbial sources, agricultural fibers, dissolved cellulose or CMC etc. In microfibrillated cellulose the individual microfibrils have been partly or totally detached from each other.

Through WO2013121108 there is disclosed a method for manufacturing an MFC using several passages through a homogenizer and performing this at a pressure of between 200-1000 bars.

Further there is disclosed in WO2007091942 a method for making MFC using a refiner.

There is thus a need for an improved process for providing a microfibrillated polysaccharide with a more homogenous size distribution which in turn may be predicted whereas at the same time the use of a refiner can be abolished and the process may be run at a relatively low pressure.

SUMMARY OF INVENTION

The present invention solves one or more of the above problems, by providing according to a first aspect a method for manufacturing microfibrillated polysaccharide, preferably a microfibrillated cellulose, comprising the following steps:
a) providing a hemicellulose containing pulp, preferably a chemical pulp,
b) providing one or more wood degrading enzymes,
c) mixing said pulp with one or more wood degrading enzymes,
d) keeping said mixture in a continuous, flowing system of an essentially cylindrical geometry,
e) conveying said mixture to one or more mixing zones for recirculating and homogenizing said mixture, and
f) harvesting during the recirculation of said step e) microfibrillated polysaccharide.

The present invention also provides according to a second aspect, a microfibrillated polysaccharide, preferably a microfibrillated cellulose, obtainable by the process according to the first aspect.

The present invention also provides according to a third aspect use of the microfibrillated polysaccharide, preferably a microfibrillated cellulose, according to the second aspect in a strength additive, a thickener, a viscosity modifier, a rheology modifier, a cleaning powder, a washing powder, a detergent, a foam composition, a barrier, a film, a food product, a pharmaceutical composition, a cosmetic product, a paper or board product, a coating, a hygiene/absorbent product, an emulsion/dispersing agent, a drilling mud, a composite material, in water purification, in a filter, in a solar cell, in a battery, in an electronic circuit, or to enhance the reactivity of cellulose in the manufacture of regenerated cellulose or cellulose derivatives.

DETAILED DESCRIPTION OF THE INVENTION

It is intended throughout the present description that the expression "microfibrillated polysaccharide" embraces any type of microfibrillated cellulose, such as microfibrillated cellulose fibres (cellulose material). The cellulose may also be a microfibrillated cellulose (MFC) or nanocellulose, nanofibrillated cellulose (NFC) or cellulose nanofibrils (CNF). The cellulose may be bleached or unbleached. The cellulose may also be crystalline cellulose, MCC (microcrystallinic cellulose; has high purity need due to its potential use in pharmaceutical compositions or other medical uses), BNC, NCC (nanocrystallinic cellulose; may be used in electrical applications and has magnetical properties), CNC, CMC (carboxymethylated cellulose) or synthetic polymer fibers and fibers made from dissolving pulp. The cellulose may be present in the form of a pulp, which may be chemical pulp, mechanical pulp, thermomechanical pulp or chemi (thermo) mechanical pulp (CMP or CTMP). Said chemical pulp is preferably a sulphite pulp or a kraft pulp. In microfibrillated cellulose the individual microfibrils have partly or fully detached from each other. MFC can be made with different means such as mechanically or chemically or enzymatically, or by using bacteria, or by combining e.g. chemical and mechanical treatment steps.

The pulp initially used in the method according to the first aspect, may consist of pulp from hardwood, softwood or both types. The pulp may e.g. contain a mixture of pine and spruce or a mixture of birch and spruce. The chemical pulps that may be used in the present invention include all types of chemical wood-based pulps, such as bleached, half-bleached and unbleached sulphite, kraft and soda pulps, and mixtures of these. The pulp may be of dissolved type. The pulp may also comprise textile fibers. The pulp may also come from agriculture (e.g. potato, bamboo or carrot).

The present invention also relates to a microfibrillated polysaccharide, such as microfibrillated cellulose, obtainable by the process of the first aspect above. It has been shown that by using the method according to the first aspect of the invention it is possible to obtain size distribution which is narrow and predictable and at the same time abolishing the use of a refiner. In addition said microfibrillated polysaccharide may be manufactured at a relatively low pressure. The size distribution of said microfibrillated polysaccharide will also resemble the distribution of a microfibrillated polysaccharide made through using a process involving a refiner.

A microfibrillated cellulose fibril is further normally very thin (~20 nm) and the length is often between 100 nm to 10 μm. However, the microfibrils may also be longer, for example between 10-200 μm, but lengths even 2000 μm can be found due to wide length distribution. Fibers that have been fibrillated and which have microfibrils on the surface and microfibrils that are separated and located in a water phase of a slurry are also included in the definition MFC. Furthermore, whiskers are also included in the definition MFC.

The microfibrillated cellulose is typically made from wood cellulose fibers, it is as said possible to use both hardwood and softwood fibers. It can also be made from microbial sources, agricultural fibers, such as wheat straw pulp, bamboo or other non-wood fiber sources. It can also be produced by bacteria or made from CMC.

According to a preferred embodiment of the first aspect of the present invention, the microfibrillated polysaccharide obtained in step f) has a relatively narrow size distribution, preferably wherein the distribution resembles a Gaussian curve, most preferred said curve has its endpoints of the size classes at about from 1 to 5, to about from 100 to 300 µm, respectively, especially preferred whereas at the same time the volume density is from about 9.0 to about 10% at the top of said curve, particularly preferred the Gaussian curve has its endpoints of the size classes at about from 3 to 5 to about from 200 to 300 µm.

According to a preferred embodiment of the first aspect of the present invention the Gaussian curve has its endpoints of the size classes at about 8 to about 100-200 µm at a volume density of about 0.5%, or has its endpoints of the size classes at about from 9 to about from 150-175 µm at a volume density of about 1.0%, or has its endpoints of the size classes at about from 15-20, to 100 µm at a volume density of about 4.0%, or a combination of two of said features or all three, wherein preferably size classes at about 30-40 µm provides a peak for the volume density.

According to preferred embodiment of the first aspect of the present invention the homogenization pressure is about 500 bars or higher, preferably about 700 to about 1000 bars.

According to preferred embodiment of the first aspect of the present invention the pressure in one or more of steps d), e) or f) is kept from about 2 to about 6 bars, preferably about 3 to about 5 bars, most preferred said ranges are applied during step d).

According to preferred embodiment of the first aspect of the present invention the continuous, flowing system of cylindrical geometry is a plug flow reactor. The continuous, flowing system of essentially cylindrical geometry may further be in a multigonal shape (thus having multigonal geometry), such as an octagonal shape.

According to preferred embodiment of the first aspect of the present invention the recirculation of the mixture in step e) is performed at least 5 times before harvesting the microfibrillated polysaccharide.

According to preferred embodiment of the first aspect of the present invention the re-circulation of the mixture in step e) is performed using at least two conveying means, such as pipes, preferably connected to said system and connected sequentially, most preferred interconnected through a pump and optionally additionally one mixing tank.

According to preferred embodiment of the first aspect of the present invention the mixture in the plug flow reactor is kept during from 1 to 5 hours, preferably from 2 to 4 hours, at a temperature from about 50° C. to about 70° C., preferably at about 60° C., and at a pressure from 2 to 6 bars, preferably 3 to 5 bars.

According to preferred embodiment of the first aspect of the present invention said pulp is a sulphite pulp, preferably pulp from softwood.

According to preferred embodiment of the first aspect of the present invention, said enzyme is used at a concentration of from 0.1 to 500 ECU/g fibres, preferably from 0.5 to 250 ECU/g fibres, most preferred 5 to 150 ECU/g fibres, especially preferred from 50 to 150 ECU/g fibres.

According to preferred embodiment of the first aspect of the present invention wherein said enzyme is a hemicellulase or a cellulase or a mixture thereof.

According to preferred embodiment of the first aspect of the present invention wherein said enzyme is a cellulase, preferably a cellulase of endoglucanase type, most preferred a mono-component endoglucanase.

Preferred features of each aspect of the invention are as for each of the other aspects mutatis mutandis. The prior art documents mentioned herein are incorporated to the fullest extent permitted by law. The invention is further described in the following examples, together with the appended figures, the only purpose of which is to illustrate the invention and are in no way intended to limit the scope of the invention in any way.

FIGURES

FIG. 1 discloses a set-up for using the method according to the first aspect whereby a plug flow reactor has been introduced combining the separate batch wise enzyme treatment with the recirculation vessel into a continuous process. FIG. 1. gives an overview of the process setup according to the first aspect. By introduction of a plug flow reactor the separate vessel for batch wise enzyme treatment can be omitted and the enzyme treatment can be run in a continuous mode (e-treated=enzyme treated).

FIG. 2 discloses a further setup for the method according to the first aspect. FIG. 2. shows a further preferred embodiment of the general process schematic of the refinerless MFC process setup according to the first aspect.

FIG. 3 discloses MFC made using the method according to the first aspect.

FIG. 4 discloses the size distribution of MFC made using the method according to the first aspect. The black curve (red curve) shows the size distribution by laser diffraction of the MFC produced with the refinerless process according to the first aspect of the present invention whereas the grey curve (green curve) shows MFC produced at a plant batch as comparison.

EXAMPLE

The method according to the first aspect had only two steps; pulp at 5% or higher solids is mixed with enzyme (ECOPULP® 892—4816, AB Enzymes—previously known as ECOPULP®—R) diluted in water so the final solids of pulp is 4%. Both the pulp and the enzyme solution were kept at 60° C. before mixing. This temperature was then kept for 3 hours without further mixing. The pre-treated material was then homogenized at 700 bars in recirculation mode which increases the temperature to 90° C. thus killing the enzyme and potential microbes. If the temperature reached over 90° C. the material was cooled to avoid boiling. The recirculation vessel would be pressurized and the temperature further increased so steam can be flashed off for energy recovery.

Viscous MFC, (see FIG. 3), was produced which indicates a high aspect ratio material and the particle size analysis by laser diffractometry indicated a particle size distribution comparable with refiner based pre-treatment process, see FIG. 4. The simplified process solution, thus the process according to the first aspect of the present invention, is easier to clean and to start up and it is also easier to maintain sterilization temperatures in the homogenization stage.

Compared to refiner based pre-treatment the time for evaluation of MFC starting materials and enzymes is greatly reduced. This is also due to the reduced recirculation volume in this design that reduces the start-up sequence time essentially.

To summarize a simplified process for the manufacture of MFC was developed and implemented in large lab scale as well as in industrial scale. The simplified solution has beside the homogenizer only two vessels one for the enzyme treatment and one for feeding, recirculation and mixing. The refining section is completely omitted. Enzyme is denatured (inactivated) by the temperature increase to 90° C. during the homogenization step. High or low pH is also possible to use.

The process equipment is easy to clean and the temperature increase ensures microbial purity of the product.

Scalability is judged to be improved compared with the current process solution due the simplification and so is the ability to keep the process at high hygienic standard.

In view of the above detailed description of the present invention, other modifications and variations will become apparent to those skilled in the art. However, it should be apparent that such other modifications and variations may be effected without departing from the spirit and scope of the invention.

The invention claimed is:

1. Method for manufacturing a microfibrillated polysaccharide, comprising the following steps:
   a) providing a hemicellulose containing pulp,
   b) providing one or more wood degrading enzymes,
   c) mixing said pulp with one or more wood degrading enzymes,
   d) keeping said mixture in a continuous, flowing system of essentially cylindrical geometry,
   e) conveying said mixture to one or more mixing zones for recirculating and homogenizing said mixture, and
   f) harvesting during the recirculation of said step e) microfibrillated polysaccharide,
   wherein the microfibrillated polysaccharide obtained in step f) has a size distribution that resembles a Gaussian curve, wherein said Gaussian curve has endpoints of the size classes between 1-5 µm to 100-300 µm, respectively.

2. A method according to claim 1 wherein the endpoints of the size classes are at about 8 to about 100-200 µm at a volume density of about 0.5%, or at about from 9 to about from 150-175 µm at a volume density of about 1.0%, or at about from 15-20 to 100 µm at a volume density of about 4.0%, or a combination of two of said features or all three, wherein size classes at about 30-40 µm provides a peak for the volume density.

3. A method according to claim 2, wherein said endpoints are at about from 1 to 5 to about from 100 to 300 µm, respectively, whereas at the same time the volume density is from about 9.0 to about 10% at the top of said curve.

4. A method according to claim 1, wherein the endpoints are at about from 3 to 5 to about from 200 to 300 µm.

5. A method according to claim 1 wherein pressure when homogenizing said mixture is about 500 bars or higher.

6. A method according to claim 1 wherein a pressure in one or more of steps d), e) or f) is kept from about 2 to about 6 bars.

7. A method according to claim 1 wherein the continuous, flowing system of essentially cylindrical geometry is a plug flow reactor.

8. A method according to claim 1 wherein the re-circulation of the mixture in step e) is performed at least 5 times before harvesting the microfibrillated polysaccharide.

9. A method according to claim 1 wherein the re-circulation of the mixture in step e) is performed using at least two conveying means.

10. A method according to claim 1 wherein the mixture of step d) is kept in a plug flow reactor from 1 to 5 hours.

11. A method according to claim 1 wherein said enzyme is used at a concentration of from 0.1 to 500 ECU/g fibres.

12. A method according to claim 1 wherein said enzyme is a hemicellulase or a cellulase or a mixture thereof.

13. A method according to claim 1 wherein said enzyme is a cellulase.

14. A method according to claim 1 wherein said pulp is a sulphite pulp.

15. A microfibrillated polysaccharide, obtainable by a method according to claim 1.

16. A method according to claim 1, wherein said microfibrillated polysaccharide is a microfibrillated cellulose.

17. A method according to claim 1, wherein the pulp is a chemical pulp.

18. A method according to claim 1, wherein a pressure when homogenizing said mixture is about 700 to about 1000 bars.

19. A method according to claim 1, wherein a pressure in one or more of steps d), e) or f) is kept from about 3 to about 5 bars.

20. A method according to claim 19, wherein the pressure in said range is applied during step d).

21. A method according to claim 1, wherein the mixture in the plug flow reactor is kept during 2 to 4 hours, at a temperature from about 50° C. to about 70° C.

22. A method according to claim 1, wherein said enzyme is used at a concentration of from 0.5 to 250 ECU/g fibres.

23. A method according to claim 1, wherein said enzyme is used at a concentration of from 5 to 150 ECU/g fibres.

24. A method according to claim 1, wherein said enzyme is used at a concentration of from 50 to 150 ECU/g fibres.

25. A method according to claim 1, wherein said enzyme is a cellulase of endoglucanase type.

26. A method according to claim 1, wherein said enzyme is a mono-component endoglucanase.

27. A method according to claim 1, wherein said pulp is a pulp from softwood.

28. A microfibrillated cellulose, obtainable by the process of claim 1.

* * * * *